(12) United States Patent
Horgan et al.

(10) Patent No.: US 11,188,038 B2
(45) Date of Patent: Nov. 30, 2021

(54) SYSTEMS AND METHODS OF OCCUPANT PATH PREDICTION

(71) Applicant: Johnson Controls Tyco IP Holdings LLP, Milwaukee, WI (US)

(72) Inventors: Donagh S. Horgan, Cork (IE); Michael T. Matthews, Cork (IE); Eamonn O'Toole, County Cork (IE)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 237 days.

(21) Appl. No.: 16/415,861

(22) Filed: May 17, 2019

(65) Prior Publication Data

US 2019/0354073 A1 Nov. 21, 2019

Related U.S. Application Data

(60) Provisional application No. 62/673,695, filed on May 18, 2018.

(51) Int. Cl.

| | |
|---|---|
| *G06F 7/04* | (2006.01) |
| *G05B 13/04* | (2006.01) |
| *G08B 21/18* | (2006.01) |
| *G07C 9/37* | (2020.01) |

(52) U.S. Cl.
CPC ............ *G05B 13/048* (2013.01); *G07C 9/37* (2020.01); *G08B 21/182* (2013.01)

(58) Field of Classification Search
CPC ....... G05B 13/048; G07C 9/37; G08B 21/182
USPC .......................................................... 726/7
See application file for complete search history.

(56) References Cited

U.S. PATENT DOCUMENTS

| | | | |
|---|---|---|---|
| 10,021,530 B2* | 7/2018 | Sigal | H04W 4/33 |
| 2009/0204320 A1* | 8/2009 | Shaffer | G01C 21/3415 |
| | | | 701/533 |
| 2010/0070171 A1* | 3/2010 | Barbeau | G01C 21/3617 |
| | | | 701/408 |
| 2012/0276517 A1* | 11/2012 | Banaszuk | G01C 21/00 |
| | | | 434/365 |
| 2014/0342688 A1* | 11/2014 | Cornett | H04W 4/023 |
| | | | 455/404.2 |

(Continued)

OTHER PUBLICATIONS

U.S. Appl. No. 16/246,447, filed Jan. 11, 2019, Johnson Controls Technology Company.

(Continued)

*Primary Examiner* — Zhen Y Wu
(74) *Attorney, Agent, or Firm* — Foley & Lardner LLP

(57) ABSTRACT

A method for predicting a path of a specific occupant of a number of occupants including receiving user access data, the user access data including a user identifier, an access time, and an access location, generating, a first model describing general sequences of access events associated with the number of occupants and a frequency of each of the general sequences, generating a second model describing specific sequences of access events associated with the specific occupant and a frequency of each of the specific sequences, and generating a path prediction model based on the first and second models, the path prediction model including a weighted score for each of the number of access control points, the weighted score associated with a probability the specific occupant accesses the access control point based on a last accessed access control point.

26 Claims, 8 Drawing Sheets

(56) References Cited

U.S. PATENT DOCUMENTS

| | | | |
|---|---|---|---|
| 2015/0005951 A1* | 1/2015 | Srinivasan | G05B 15/02 |
| | | | 700/275 |
| 2016/0088438 A1* | 3/2016 | O'Keeffe | H04W 4/21 |
| | | | 455/456.2 |
| 2016/0178376 A1* | 6/2016 | Moore | G08G 1/143 |
| | | | 701/532 |
| 2017/0013406 A1* | 1/2017 | Oliver | H04L 65/608 |
| 2017/0055126 A1* | 2/2017 | O'Keeffe | H04W 4/023 |
| 2018/0206096 A1* | 7/2018 | Sharma | H04W 4/80 |
| 2018/0315300 A1 | 11/2018 | Subramanian et al. | |
| 2019/0354073 A1* | 11/2019 | Horgan | G07C 9/28 |

OTHER PUBLICATIONS

U.S. Appl. No. 16/269,384, filed Feb. 6, 2019, Johnson Controls Technology Company.
U.S. Appl. No. 16/368,620, filed Mar. 28, 2019, Johnson Controls Technology Company.
U.S. Appl. No. 16/368,611, filed Mar. 28, 2019, Johnson Controls Technology Company.

* cited by examiner

SYSTEMS AND METHODS OF OCCUPANT PATH PREDICTION

CLAIM OF PRIORITY

This application claims priority to provisional U.S. Patent Application 62/673,695 filed on May 18, 2018, entitled: "Systems and Methods of Occupant Path Prediction," the entire contents of which are incorporated by reference herein.

BACKGROUND

The present disclosure relates generally to a building management system (BMS) and more particularly to predicting occupant pathways in a building via a BMS.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices can be installed in any environment (e.g., an indoor area or an outdoor area) and the environment can include any number of buildings, spaces, zones, rooms, or areas. A BMS can include a variety of devices (e.g., HVAC devices, controllers, chillers, fans, sensors, music, lighting, etc.) configured to facilitate monitoring and controlling the building space.

A BMS that includes a security system can provide access control systems to protect building occupants and secure internal elements (e.g., sensitive documents, money, technology, etc.). A BMS can monitor and control access to the building as a whole, as well as specific areas (e.g., rooms, zones) within the building.

SUMMARY

One implementation of the present disclosure is a method for predicting a path of a specific occupant of a number of occupants including receiving, at a building controller including one or more processors, from a number of access control points, user access data, the user access data including a user identifier, an access time, and an access location, generating, by the building controller, a first model based on the user access data for the number of occupants, the first model describing general sequences of access events associated with the number of occupants and a frequency of each of the general sequences, generating, by the building controller, a second model based on the user access data for the specific occupant, the second model describing specific sequences of access events associated with the specific occupant and a frequency of each of the specific sequences, and generating, by the building controller, a path prediction model based on the first and second models, the path prediction model including a weighted score for each of the number of access control points, the weighted score associated with a probability the specific occupant accesses the access control point based on a last accessed access control point.

In some embodiments, the weighted score is based on a time between access events, a location of the access control point, and the user identifier associated with the access events. In some embodiments, the user access data for the number of occupants are associated with a first area and the user access data for the specific occupant is associated with a second area that is smaller than the first area and wherein the weighted score for each specific access control point of the number of access control points is based on a weighted combination of the first model and the second model, wherein the weighted combination is based on a location of the specific access control point, the first area, and the second area. In some embodiments, a weight of the second model is larger than a weight of the first model for the weighted score associated with each specific access control point located outside the second area. In some embodiments, the method further includes generating a third model based on the user access data for a number of occupants associated with the specific occupant, the third model describing a common sequence of access events associated with the number of occupants associated with the specific occupant and the frequency of each of the common sequences and generating the path prediction model based on the first, second, and third models. In some embodiments, the method further includes generating a score for the specific occupant, the score describing an amount of deviation from the path prediction model, storing the score in memory, and generating an alert if the score exceeds a threshold. In some embodiments, the access control points are at least one of door controllers or badge readers. In some embodiments, the method further includes predicting an access control point of the number of access control points to be accessed next by the specific occupant based on the path prediction model. In some embodiments, the method further includes comparing the path prediction model to one or more restrictions associated with the specific occupant and generating an alert based on the comparison.

Another implementation of the present disclosure is a path prediction system including a path prediction circuit, the path prediction circuit including a processor and memory coupled to the processor, the memory having instructions stored thereon, that when executed by the processor cause the path prediction circuit to receive first user access data from a number of access control points, the first user access data including a user identifier, an access time, and an access location, generate a path prediction model, the path prediction model including a weighted score for each of the number of access control points, the weighted score describing a probability a user accesses the access control point, receive second user access data from an access control point, the second user access data associated with an access event of the user, compare the second user access data to the path prediction model to determine a score for the user, the score based on a deviation from the path prediction model, and generate an alert if the score exceeds a threshold.

In some embodiments, the access control points include at least one of a door controller or a badge reader. In some embodiments, generating the path prediction model further includes generating a first model based on the first user access data associated with a number of occupants, the first model describing general sequences of access events associated with the number of occupants and a frequency of each of the general sequences, generating a second model based on the first user access data associated with the user, the second model describing specific sequences of access events associated with the user and a frequency of each of the specific sequences, and merging the first model and the second model. In some embodiments, generating the path prediction model further includes generating a third model based on the first user access data associated with a number of occupants associated with the user, the third model describing a common sequence of access events associated with the number of occupants associated with the user and a frequency of each of the common sequences, and merging the first, second, and third models. In some embodiments, the system predicts a path of an unknown user based on the first model. In some embodiments, the first user access data associated with the number of occupants are associated with a first area and the first user access data associated with the user is associated with a second area that is smaller than the first area and wherein the weighted score for each specific access control point of the number of access control points is based on a weighted combination of the first model and the second model, wherein the weighted combination is based on a location of the specific access control point, the first area, and the second area. In some embodiments, a weight of the second model is larger than a weight of the first model for the weighted score associated with each specific access control point located outside the second area. In some embodiments, the weighted score is based on a time between access events, a location of the access control point, and the user identifier associated with the access events. In some embodiments, the path prediction circuit predicts an access control point of the number of access control points to be accessed next by the user based on the path prediction model.

Another implementation of the present disclosure is a security controller for a building management system (BMS) including a processing circuit, the processing circuit including one or more processors and one or more memories, the one or more memories storing instructions thereon that, when executed by the one or more processors, cause the processing circuit to, receive, from a first number of access control devices, first access control data associated with a first number of users, generate, based on the first access control data, a first model, the first model describing a first number of paths taken by the first plurality of users, receive, from a second number of access control devices, second access control data associated with an individual user, generate, based on the second access control data, a second model, the second model describing a second number of paths taken by the individual user, receive, from a third number of access control devices, third access control data associated with a second number of users each of which are associated with the individual user, generate, based on the third access control data, a third model, the third model describing a third number of paths taken by the second number of users, and for each individual user in the number of users, generate a path prediction model based on the first, second, and third models, the path prediction model including a weighted score for each of the number of access control devices, the weighted score associated with a probability the individual user accesses the access control device based on a last accessed access control device.

In some embodiments, the first, second, and third access control data include a user identifier, an access time, and an access location. In some embodiments, each path of the first, second, and third number of paths include a sequence of access control devices. In some embodiments, the access control devices include at least one of a door controller or a badge reader. In some embodiments, the system predicts a path of an unknown user based on the first model. In some embodiments, the weighted score is based on a time between access events, a location of the access control point, and a user identifier of the individual user. In some embodiments, the first access control data associated with the first number of users are associated with a first area and the second access control data associated with the individual user is associated with a second area that is smaller than the first area and wherein the weighted score for each specific access control point of the number of access control points is based on a weighted combination of the first model and the second model, wherein the weighted combination is based on a location of the specific access control point, the first area, and the second area. In some embodiments a weight of the second model is larger than a weight of the first model for the weighted score associated with each specific access control point located outside the second area.

DETAILED DESCRIPTION

Overview

Monitoring and controlling building access can help identify and minimize potential threats. Potential threats can include physical threats to occupants, as well as data security breaches, among others. A building management system (BMS) can include a security system capable of monitoring and/or controlling access to areas within a building. The monitoring of access points within a building traditionally does not extend beyond using the gathered data to identify a security breach. However, once a security breach has occurred, it can be difficult to minimize the potential damage. Accordingly, the present disclosure includes systems and methods for using access data to predict building usage and identify potential security threats.

In some embodiments, access control data may be utilized by a BMS to predict the movement of an occupant through a building. Access control data can be obtained each time an occupant provides credentials to gain entry to an area (e.g., an occupant can scan or swipe an employee badge, input a password to an access interface, etc.). Alternatively, an occupant can be tracked using location data from a user device (e.g., a cellphone, laptop, tablet, etc).

In some embodiments, the BMS can use the access control data to predict where the occupant will travel to, based on their current position (e.g., using the last known access point, and/or using the real-time location data from a user device), and past behavior. In some embodiments, the BMS may implement a Bayesian network to predict occupant position. If the occupant's next position deviates from the BMS prediction, the BMS can determine if a security threat exists. In some embodiments, the BMS can identify a security threat, and initiate additional security measures (e.g., sound an alarm, alert an authorized user, alert authorities, etc.).

A path prediction model can be implemented by the BMS to predict an occupant's movements. In some embodiments, the path prediction model can be created using an occupant's individual data (e.g., name, identification number, historical path trends, etc.). Alternatively, the path prediction model can be created using aggregated data (e.g., using all available occupant data, a generalized path prediction model can be used for unknown/unrecognized occupants).

In some embodiments, the historical path trends of an occupant are updated based on newly captured path data. Accordingly, the path prediction model can be verified and/or become more accurate over time.

In some embodiments, the BMS can provide past path data of specific occupants. For example, a system administrator can request to view path data for occupants suspected of theft from the building. The system administrator can specify the desired occupants, locations, and times.

Building HVAC Systems and Building Management Systems

Figure 1:
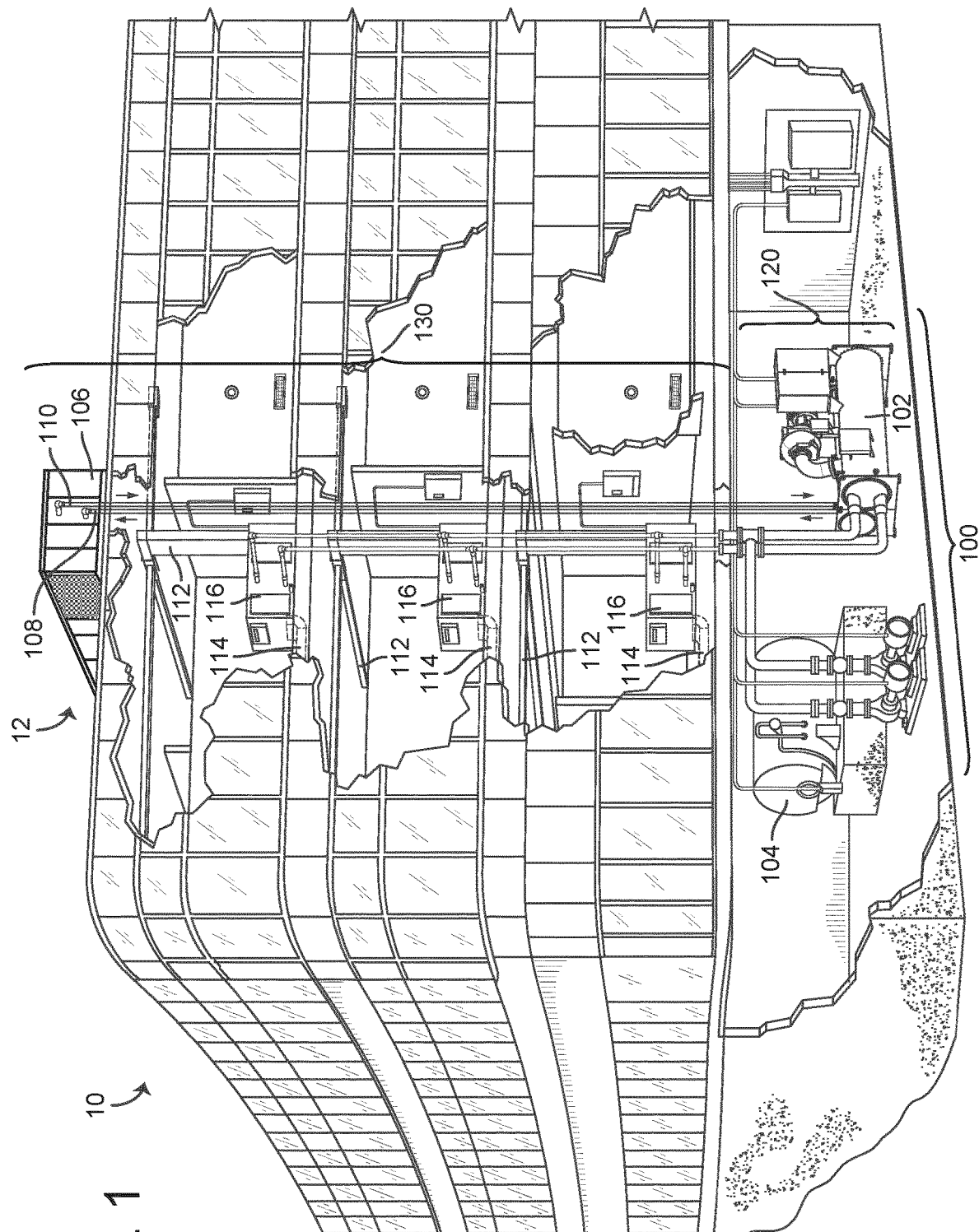
FIG. 1 is a drawing of a building equipped with a HVAC system, according to some embodiments.
Figure 2:
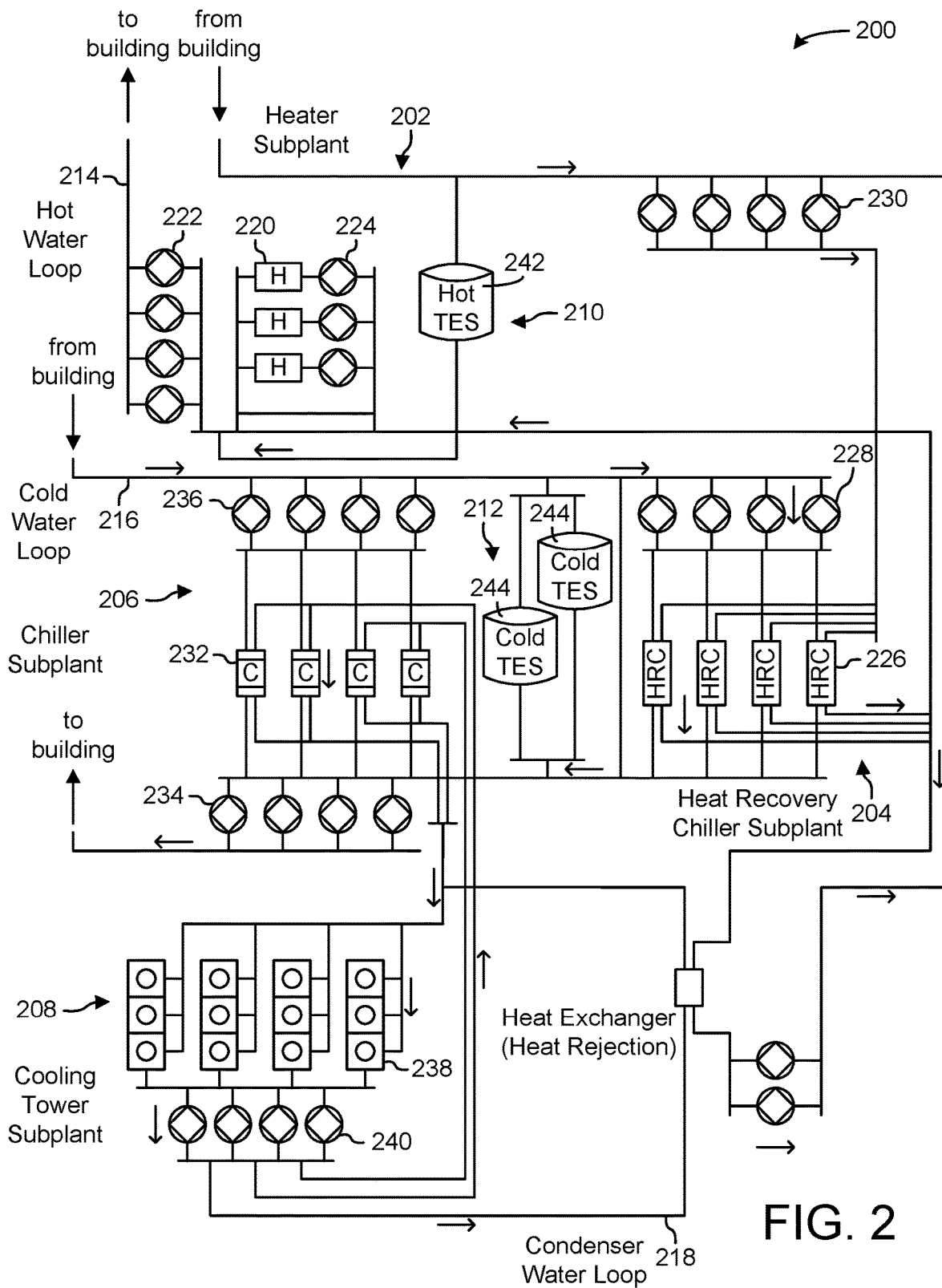
FIG. 2 is a block diagram of a waterside system to serve the building of FIG. 1, according to some embodiments.
Figure 3:
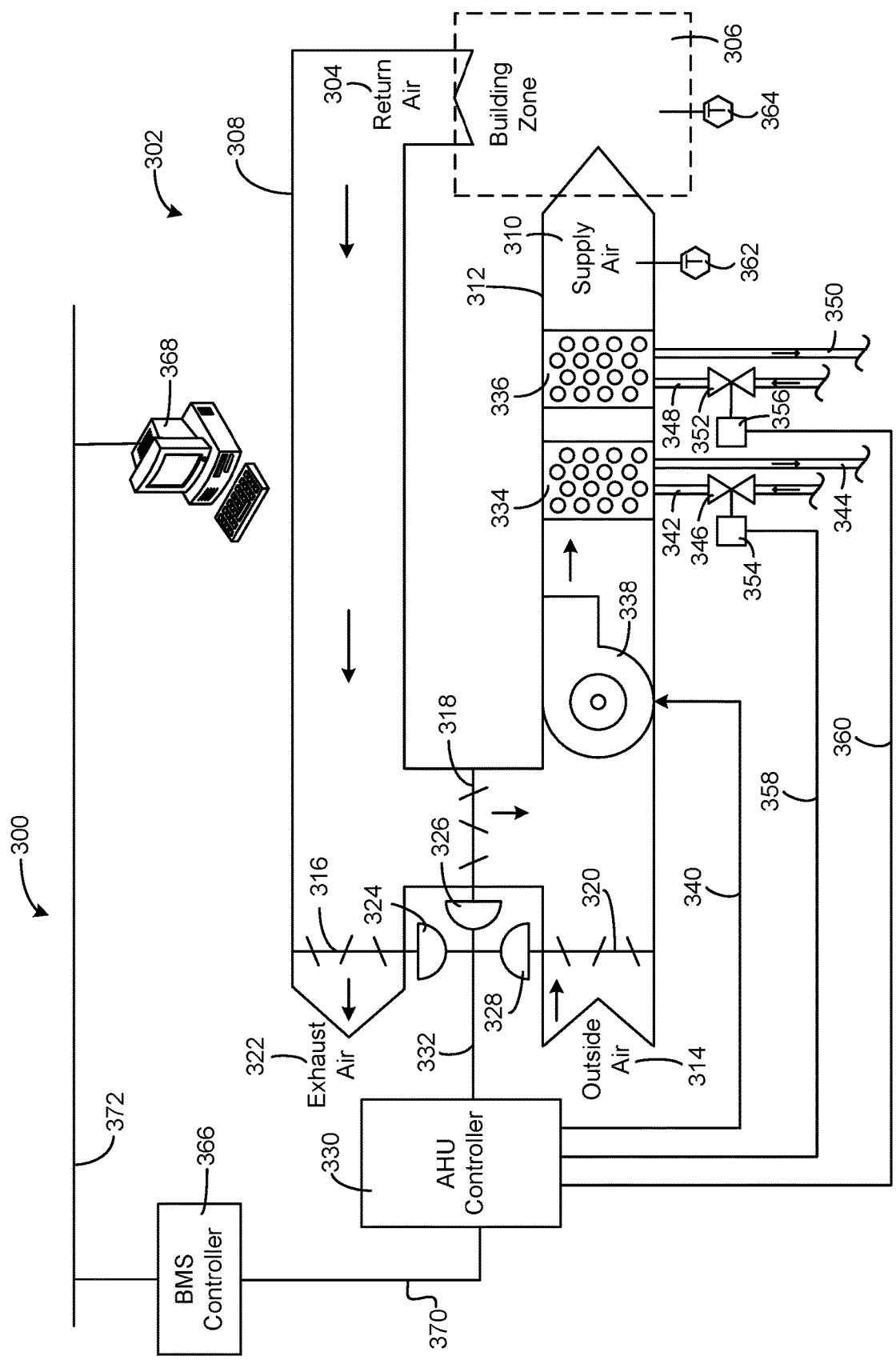
FIG. 3 is a block diagram of an airside system to serve the building of FIG. 1, according to some embodiments.
Figure 4:
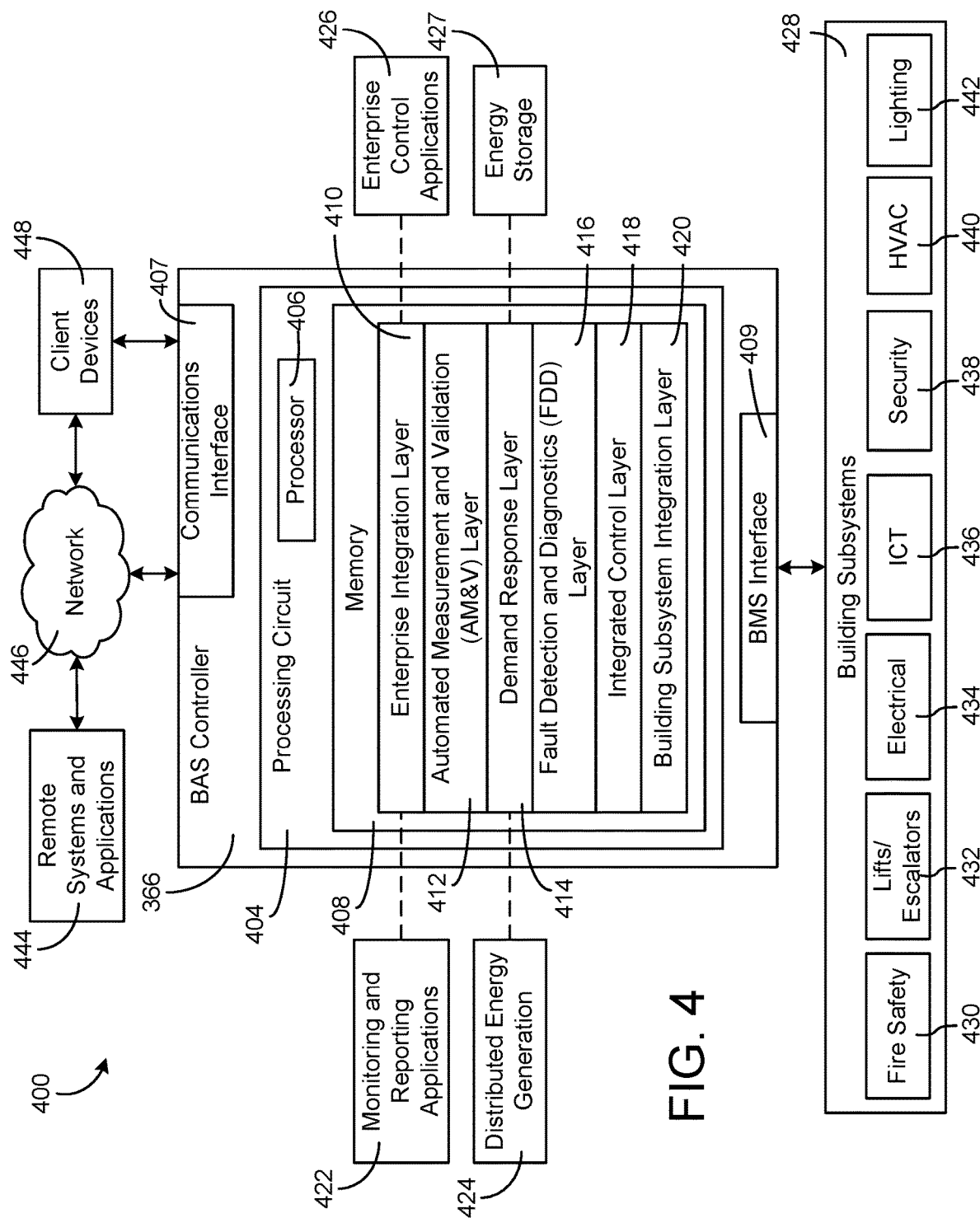
FIG. 4 is a block diagram of a building management system (BMS) to monitor and control the building of FIG. 1, according to some embodiments.

Referring now to FIGS. 1-4, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a number of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a number of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a number of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a number of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a number of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a number of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and can correlate with the amount of energy consumed to achieve a desired supply air temperature. AHU 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a number of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a number of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a number of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Occupant Path Prediction

Referring now to FIGS. 5-8, systems and methods for path predictions are shown, according to some embodiments.

Figure 5:
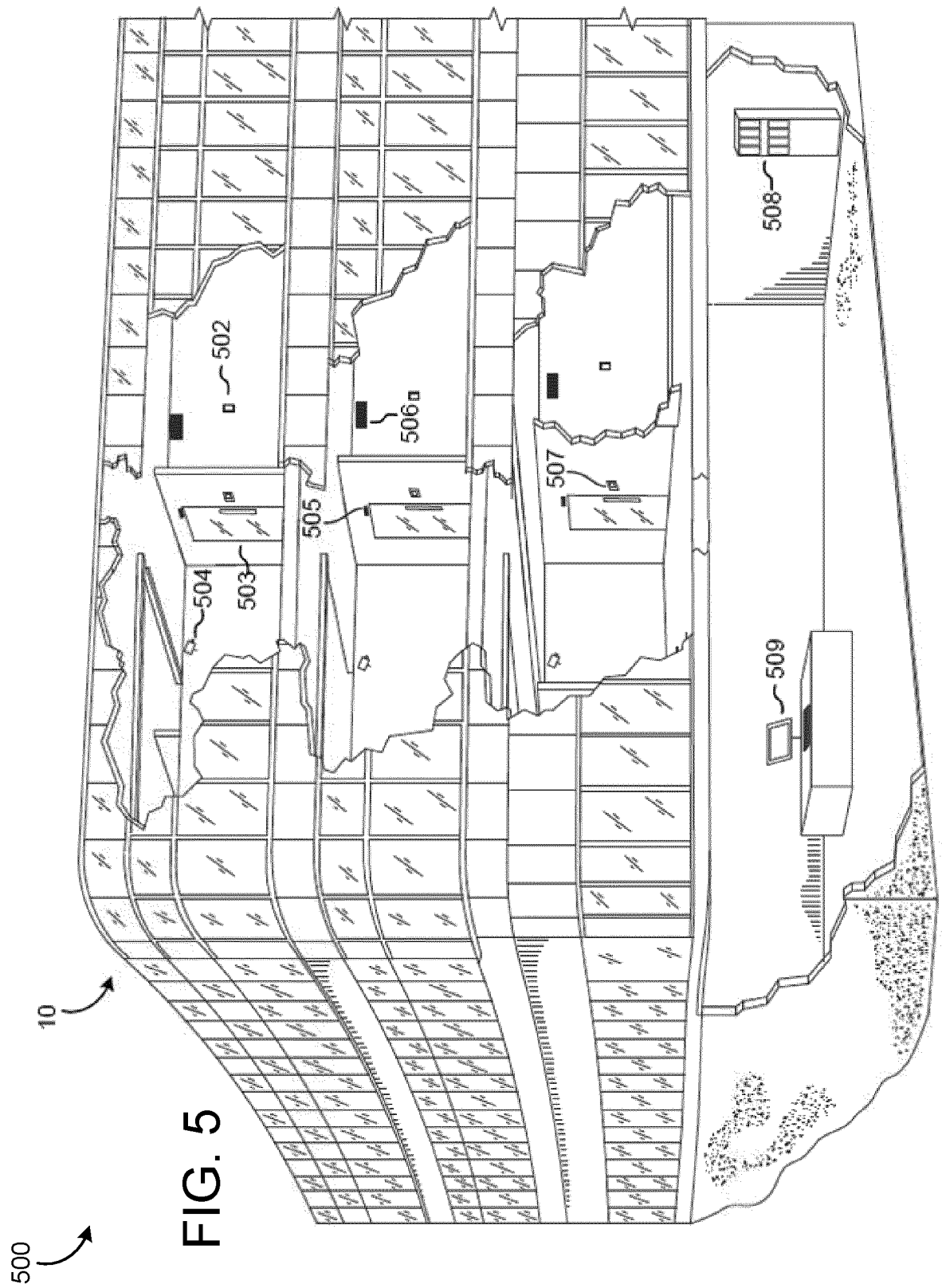
FIG. 5 is a drawing of access control elements to monitor and control the building of FIG. 1, according to some embodiments.

FIG. 5 is a drawing of an access control system 500 which can be used to monitor and control building 10. In some embodiments, building 10 can be an office, manufacturing plant, or school, among other building types. In some embodiments, building 10 can include a number of access control elements. As shown, access control system 500 can include an exit control system 502, an internal door 503, a security camera 504, a door lock 505 (e.g., a magnetic door lock), a door controller 506, a card reader 507, a central security server 508, and/or a security console 509 (collectively, "access control elements"). In some embodiments, central security server 508 can communicate with internal door lock 503, security camera 504, door lock 505, door controller 506, card reader 507, and/or security console 509. Further, central security server 508 can provide security console 509 with data from the access control elements. In some embodiments, communication can occur via communications network 446. In some embodiments, the access control elements can be included in security subsystem 438 corresponding to building 10. Security subsystem 438 can provide access control data to BMS controller 366, which can be subsequently analyzed to determine potential security threats.

Figure 6:
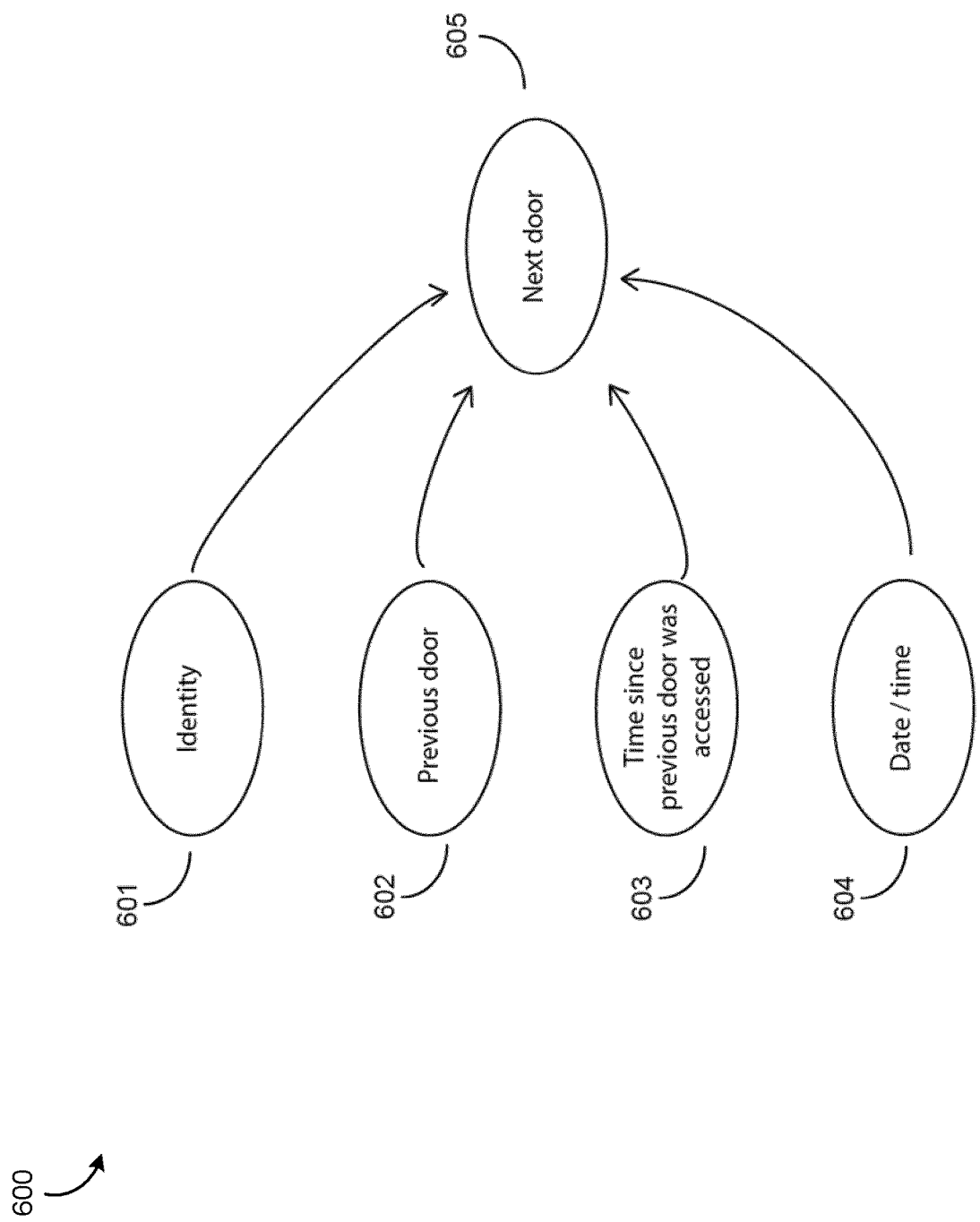
FIG. 6 is a block diagram of system inputs, according to some embodiments.

Referring now to FIG. 6, a block diagram of path prediction model inputs is shown, according to some embodiments. The path prediction model inputs can be used by BMS controller 366 to predict a path of an occupant within building 10. As shown, path prediction model inputs can include an identity input 601, a previous door input 602, a time input 603 (e.g., time since the previous door was accessed), and date/time input 604. The path prediction model inputs (e.g., 601, 602, 603, 604) can be used to predict a next door output 605.

In some embodiments, identity input 601 can include data corresponding to an occupant identity. The occupant identity can be determined via card reader 507, for example. When an occupant scans their assigned ID card using card reader 507, central security server 508 can determine the corresponding occupant data. In some embodiments, central security server 508 can access a database of known occupant data. Occupant data can include name, job position, and/or previous pathway information. The previous pathway information can correspond to typical access points (e.g., doors) that the occupant uses, past access data (e.g., date, time, etc.), assigned workspaces, and/or access privileges. Previous pathway information can include additional historical usage data corresponding to the occupant.

In some embodiments, occupant data can be generated from a user device. For example, an occupant may have a company cellphone configured to communicate with BMS controller 366 and/or central security server 508. The cellphone can provide an occupant name to central security server 508, which can then determine additional occupant data.

In some embodiments, an occupant may not be identified (e.g., they use a guest access card, are new to the building, etc.). Accordingly, BMS controller 366 can provide a path prediction model using aggregated data from multiple occupants (or all occupants) within building 10. Advantageously, the generalized path prediction model can reflect common areas of occupancy, and common access points (e.g., if most occupants visit the cafeteria, the generalized path prediction model can reflect a high probability that an unrecognized occupant will visit the cafeteria). For example, BMS controller 366 may ingest path prediction model inputs for every occupant within building 10 to generate a path prediction model that describes the most used routes within a building for all occupants. This generalized path prediction model may be used to augment a path prediction model specific to an individual occupant. For example, if an individual occupant commonly travels on floor 3 of building 10, the path prediction model inputs associated with the individual occupant may be used to generate a specific path prediction model for the individual occupant corresponding to floor 3. However because the individual occupant does not commonly travel to other floors than floor 3, a generalized path prediction model may be used to generate a specific path prediction model for the individual occupant corresponding to other floors.

In some embodiments, BMS controller 366 compares the path prediction model of first occupant to the path prediction model of one or more occupants similar to the first occupant. For example, the path prediction model of a first occupant with the title "janitor" may be compared to the path prediction model of a second occupant with the title "janitor." Similarly, the path prediction model of a third occupant associated with the third-shift may be compared to the path prediction model of a fourth occupant associated with the third-shift. In some embodiments, the path prediction model of one or more occupants similar to the first occupant may be used to augment or generate a path prediction model of the first occupant. For example, BMS controller 366 may generate a path prediction model for a first occupant corresponding to a first building based on an existing path prediction model for a second occupant associated with the first building. In some embodiments, comparing similar occupants may be used to improve the path prediction model of a specific occupant lacking a sufficient amount of path prediction model inputs. For example, if a first occupant rarely travels to a first section of building 10, but a second occupant travels to the first section of building 10 frequently, the path prediction model of the second occupant may inform the path prediction model of the first occupant.

In some embodiments, BMS controller 366 can generate a spatial connectivity model describing the connections between multiple elements of access control system 500 (e.g., an internal door 503, etc.). In some embodiments, the spatial connectivity model may be populated and/or overlaid with the path prediction model described herein. Systems and methods of spatial connectivity modeling are described in U.S. patent application Ser. No. 16/269,384, titled "Building Access Control System with Spatial Modeling," filed Feb. 6, 2019, the entirety of which is incorporated by reference herein.

In some embodiments, BMS controller 366 can generate a score associated with the path prediction model for an occupant. For example, BMS controller 366 may compare access activity of the occupant to the path prediction model of the occupant to calculate a deviation from the path prediction model. In some embodiments, BMS controller 366 may store the deviation as a score associated with the occupant. In some embodiments, the score may be used to generate alarms. For example, if an occupant accesses a restricted section of building 10, causing a large deviation from the path prediction model associated with the occupant, BMS controller 366 may update a score associated with the individual, causing the score to exceed a threshold and trigger an alert to have security contact the occupant.

In some embodiments, previous door input 602 can include a door identifier and/or a corresponding door location. Previous door input 602 can be updated each time an occupant accesses a new door. Door access can be determined using card reader 507, and/or a user device that can provide tracking information to BMS controller 366.

In some embodiments, time input 603 can provide an indication of how much time has passed since the last door was accessed by the occupant. As will be described, this time measurement can affect the probability of a door being the next accessed door (e.g., if door B is close to door A, and door C is far away from door A, the more time that passes after accessing door A, the higher the probability that the occupant will access door C next). Additionally, date/time input 604 can be used in determining the probability of the next door (e.g., next door output 605), as described with respect to FIGS. 7-8.

Figure 7:
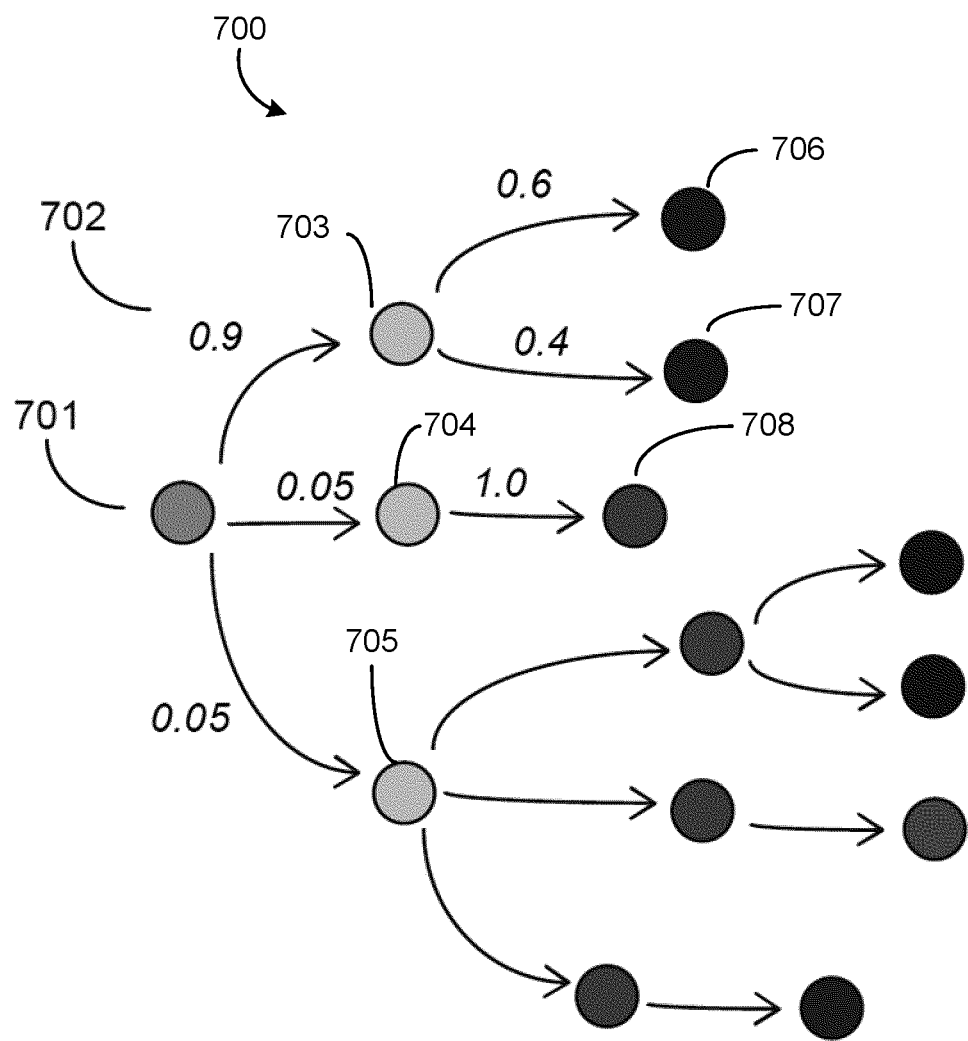
FIG. 7 is a block diagram of outputs from a path prediction model, according to some embodiments.

Referring now to FIG. 7, example outputs 702 from a path prediction model 700 are shown, according to some embodiments. The path prediction model can be implemented via BMS controller 366. In this example, each door (e.g., internal door 503) is shown as a circle (e.g., door 701). As shown, an occupant first accesses door 701. At this access point, the occupant can be identified via central security server 508. Once the occupant is identified, their past access data can be determined. In some embodiments, the path prediction model uses door 701 (e.g., previous door input 602), the occupant identity and access history (e.g., identity input 601), time since door 701 was accessed (e.g., time input 603), and the current date/time (e.g., date/time input 604) to determine the probability of each available door as being the next door (e.g., next door 605). In some embodiments, the probability for each available door can change as the time increases since door 701 was accessed. This can be beneficial in situations where the available doors are distinctly different distances from the previous door (e.g., door 701). As time increases, for example, the probability of the further door as the "next door," can increase.

As shown by FIG. 7, an occupant can first access door 701. The BMS controller 366 then uses the path prediction model to generate the probability of the next door being door 703 (0.9 probability), door 704 (0.05 probability), and door 705 (0.05 probability). In this example, the occupant is likely to select door 703 as the next door.

If the occupant selects door 703 as the next door, previous door input 602 can be updated to door 703. Additionally, the date/time input 604 and/or the time input 603 can be updated. The path prediction model can be used to again determine the probability of each available door being the next door. As shown, the probabilities of doors 706 and 707 are 0.6 and 0.4, respectively.

Alternatively, if the occupant selects door 704 as the next door (as opposed to door 703 or door 705), previous door input 602 can be updated to door 704. Additionally, the date/time input 604 and/or the time input 603 can be updated. The path prediction model can be used to again determine the probability of each available door being the next door. As shown, there is only one available door after door 704. Accordingly, the probability of door 708 being the next door is 1.0.

Alternatively, if the occupant selects door 705 as the next door (as opposed to door 703 or door 704), previous door input 602 can be updated to door 705. Additionally, the date/time input 604 and/or the time input 603 can be updated. The path prediction model can be used to again determine the probability of each available door being the next door. As shown, there are three available doors after door 705. Accordingly, the path prediction model can continue to predict the next door as the occupant travels through the building (e.g., building 10). The iterative prediction process can continue until the occupant exits the building, or until the occurrence of a predetermined event (e.g., after a certain period of time, after the occupant reaches a certain location within the building, after a period of inactivity by the occupant, etc.).

In some embodiments, a user device can be used to track an occupant (e.g., a cell phone that is carried by the occupant). The user device location can be used by BMS controller 366 to predict door access, similarly to the process described above. However, the user device can provide location data more frequently, which allows for additional types of predictions. In some embodiments, for example, the user device can communicate location data with BMS controller 366, and BMS controller 366 can provide real-time path prediction. The real-time path predictions can include, for example, what hallway the occupant will enter, what elevator or staircase the occupant will use, etc.

In some embodiments, BMS controller 366 can predict what each occupant's path is most likely to be, based on their historical usage data. Deviations from the path predicted model can indicate suspicious behavior. In some embodiments, this suspicious behavior can be used to trigger automated responses. For example, a building occupant takes an unusual route during the weekend. Although the occupant has access to these doors, their current route suggests suspicious activity. Accordingly, BMS controller 366 can generate an alert for security personnel. In some embodiments, the alert can be via alarm, phone call, text message, email, and/or security console 509, for example.

As described above, a generalized path prediction model can be used for new or unrecognized building occupants. The generalized path prediction model can be created based on aggregate occupant data. There are many operations that can include a generalized path prediction model. In some embodiments, the BMS controller 366 can use the generalized path prediction model to predict the path of an intruder. This can help security personnel predict attacks on high-value assets, as well as identify the best location to restrain or interact with an intruder. In some situations, when a known occupant deviates from their unique path prediction model, BMS controller 366 can apply the generalized path prediction model. This can help prevent unnecessary alerts.

In some embodiments, BMS controller 366 can be enabled to generate path prediction models by an administrator. In some situations, path prediction models may not be necessary on a daily basis. However, if a theft occurs, for example, the administrator can activate the path prediction model operations to help identify further suspicious behavior.

Figure 8:
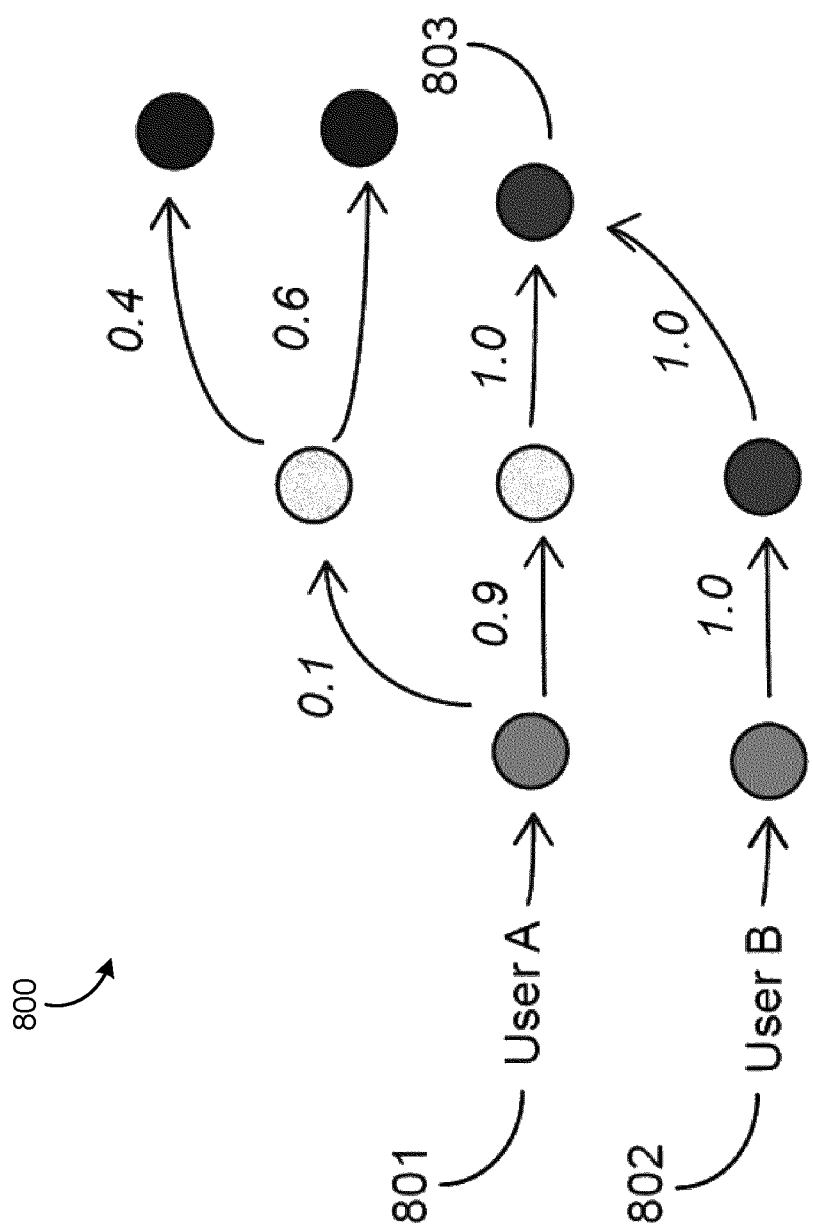
FIG. 8 is a block diagram of a combined path prediction model for two example occupants, according to some embodiments.

Referring now to FIG. 8, a block diagram of a path prediction model for two example occupants is shown, according to some embodiments. By combining the path prediction models of two occupants, BMS controller 366 can determine the probability of the occupants being in the same place. Advantageously, this operation can be used when occupants should not be near one another. By predicting the path of each occupant, administrators and security personnel can prevent at odds occupants from being in the same place, before it occurs.

In some embodiments, BMS controller 366 can use combined path prediction models to prevent two occupants from coming into contact with one another. For example, if a restraining order exists between two occupants, the path prediction models can help to ensure that the required distance is maintained between them.

In some embodiments, for example, a combined path prediction model can be used to prevent two employees from coming into contact with one another. For example, ethical walls (or information barriers) must be maintained for some organizations. An ethical wall or information barrier is a screening barricade established within a company to prevent conflicts of interest between employees. For example, an investment banker on a single portfolio in a large investment bank can have information that could impact other portfolios. To remove the risk of a conflict of interest, companies take measures to guard information, creating an ethical wall. In some embodiments, a path prediction model can be used to create an audit trail to show compliance with an ethical wall rule. Further, the path prediction model can be used to estimate the probability of how well an ethical wall would work in an environment (e.g., building 10).

Still referring to FIG. 8, an example of a combined path prediction model is shown, according to some embodiments. Here, the path prediction model 801 (corresponding to User A) is combined with the path prediction model 802 (corresponding to User B). Similarly to FIG. 7, each circle represents a door within the building (e.g., internal door 503, building 10). As shown by the model, it can be possible for User A and User B to cross paths at door 803. Accordingly, it can be beneficial to monitor the path of User A and User B, if they need to remain separate.

User B is shown to have a probability of 1.0 for arriving at door 803, which can be a result of a limited number of available doors. In comparison, User A is shown to have a 0.9 probability of advancing towards door 803, and a subsequent probability of 1.0 for arriving at door 803. To prevent User A and User B from both arriving at door 803, BMS controller 366 can alert User A, User B, administrators, and/or security personnel. Since both User A and User B can have a probability of 1.0 at the second set of doors for arriving at door 803, BMS controller 366 can send an alert at that point, prior to User A and User B arriving at door 803.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps can differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for predicting a path of a specific occupant of a plurality of occupants, the method comprising:

receiving, at a building controller comprising one or more processors, from a plurality of access control points, user access data, the user access data comprising a user identifier, an access time, and an access location;

generating, by the building controller, a first model based on the user access data for the plurality of occupants, the first model describing general sequences of access events associated with the plurality of occupants and a frequency of each of the general sequences;

generating, by the building controller, a second model based on the user access data for the specific occupant, the second model describing specific sequences of access events associated with the specific occupant and a frequency of each of the specific sequences; and generating, by the building controller, a path prediction model based on the first and second models, the path prediction model comprising a weighted score for each of the plurality of access control points, the weighted score associated with a probability the specific occupant accesses the access control point based on a last accessed access control point.

2. The method of claim 1, wherein the weighted score is based on a time between access events, a location of the access control point, and the user identifier associated with the access events.

3. The method of claim 2, wherein the user access data for the plurality of occupants are associated with a first area and the user access data for the specific occupant is associated with a second area that is smaller than the first area and wherein the weighted score for each specific access control point of the plurality of access control points is based on a weighted combination of the first model and the second model, wherein the weighted combination is based on a location of the specific access control point, the first area, and the second area.

4. The method of claim 3, wherein a weight of the second model is larger than a weight of the first model for the weighted score associated with each specific access control point located outside the second area.

5. The method of claim 1, the method further comprising:
generating a third model based on the user access data for a plurality of occupants associated with the specific occupant, the third model describing a common sequence of access events associated with the plurality of occupants associated with the specific occupant and the frequency of each of the common sequences; and
generating the path prediction model based on the first, second, and third models.

6. The method of claim 1, the method further comprising:
generating a score for the specific occupant, the score describing an amount of deviation from the path prediction model;
storing the score in memory; and
generating an alert if the score exceeds a threshold.

7. The method of claim 1, wherein the access control points are at least one of door controllers or badge readers.

8. The method of claim 1, further comprising predicting an access control point of the plurality of access control points to be accessed next by the specific occupant based on the path prediction model.

9. The method of claim 1, further comprising comparing the path prediction model to one or more restrictions associated with the specific occupant and generating an alert based on the comparison.

10. A path prediction system, the system comprising:
a path prediction circuit, the path prediction circuit comprising a processor and memory coupled to the processor, the memory having instructions stored thereon, that when executed by the processor cause the path prediction circuit to:
receive first user access data from a plurality of access control points, the first user access data comprising a user identifier, an access time, and an access location;
generate a path prediction model, the path prediction model comprising a weighted score for each of the plurality of access control points, the weighted score describing a probability a user accesses the access control point;
receive second user access data from an access control point, the second user access data associated with an access event of the user;
compare the second user access data to the path prediction model to determine a score for the user, the score based on a deviation from the path prediction model; and
generate an alert if the score exceeds a threshold.

11. The path prediction system of claim 10, the access control points comprising at least one of a door controller or a badge reader.

12. The path prediction system of claim 10, generating the path prediction model further comprising:
generating a first model based on the first user access data associated with a plurality of occupants, the first model describing general sequences of access events associated with the plurality of occupants and a frequency of each of the general sequences;
generating a second model based on the first user access data associated with the user, the second model describing specific sequences of access events associated with the user and a frequency of each of the specific sequences; and
merging the first model and the second model.

13. The path prediction system of claim 12, generating the path prediction model further comprising:
generating a third model based on the first user access data associated with a plurality of occupants associated with the user, the third model describing a common sequence of access events associated with the plurality of occupants associated with the user and a frequency of each of the common sequences; and
merging the first, second, and third models.

14. The path prediction system of claim 13, wherein the system predicts a path of an unknown user based on the first model.

15. The path prediction system of claim 14, wherein the first user access data associated with the plurality of occupants are associated with a first area and the first user access data associated with the user is associated with a second area that is smaller than the first area and wherein the weighted score for each specific access control point of the plurality of access control points is based on a weighted combination of the first model and the second model, wherein the weighted combination is based on a location of the specific access control point, the first area, and the second area.

16. The path prediction system of claim 15, wherein a weight of the second model is larger than a weight of the first model for the weighted score associated with each specific access control point located outside the second area.

17. The path prediction system of claim 10, wherein the weighted score is based on a time between access events, a location of the access control point, and the user identifier associated with the access events.

18. The path prediction system of claim 10, wherein the path prediction circuit predicts an access control point of the plurality of access control points to be accessed next by the user based on the path prediction model.

19. A security controller for a building management system (BMS), the security controller comprising:
a processing circuit, the processing circuit comprising one or more processors and one or more memories, the one or more memories storing instructions thereon that, when executed by the one or more processors, cause the processing circuit to:
receive, from a first plurality of access control devices, first access control data associated with a first plurality of users;
generate, based on the first access control data, a first model, the first model describing a first plurality of paths taken by the first plurality of users;
receive, from a second plurality of access control devices, second access control data associated with an individual user;

generate, based on the second access control data, a second model, the second model describing a second plurality of paths taken by the individual user;

receive, from a third plurality of access control devices, third access control data associated with a second plurality of users each of which are associated with the individual user;

generate, based on the third access control data, a third model, the third model describing a third plurality of paths taken by the second plurality of users; and for each individual user in the plurality of users, generate a path prediction model based on the first, second, and third models, the path prediction model comprising a weighted score for each of the plurality of access control devices, the weighted score associated with a probability the individual user accesses the access control device based on a last accessed access control device.

20. The security controller of claim 19, the first, second, and third access control data comprising a user identifier, an access time, and an access location.

21. The security controller of claim 20, each path of the first, second, and third plurality of paths comprising a sequence of access control devices.

22. The security controller of claim 19, the access control devices comprising at least one of a door controller or a badge reader.

23. The security controller of claim 19, wherein the system predicts a path of an unknown user based on the first model.

24. The security controller of claim 19, wherein the weighted score is based on a time between access events, a location of the access control point, and a user identifier of the individual user.

25. The security controller of claim 24, wherein the first access control data associated with the first plurality of users are associated with a first area and the second access control data associated with the individual user is associated with a second area that is smaller than the first area and wherein the weighted score for each specific access control point of the plurality of access control points is based on a weighted combination of the first model and the second model, wherein the weighted combination is based on a location of the specific access control point, the first area, and the second area.

26. The security controller of claim 25, wherein a weight of the second model is larger than a weight of the first model for the weighted score associated with each specific access control point located outside the second area.

* * * * *